July 18, 1933.   C. MAURY ET AL   1,919,115
DEVICE FOR GIVING MOVING PICTURES THE APPEARANCE OF RELIEF
Filed June 30, 1931
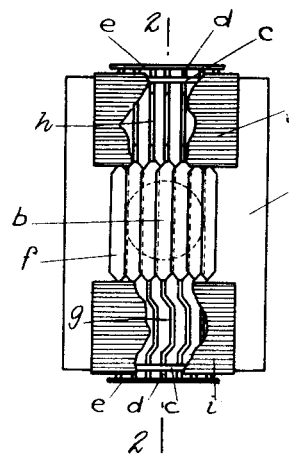
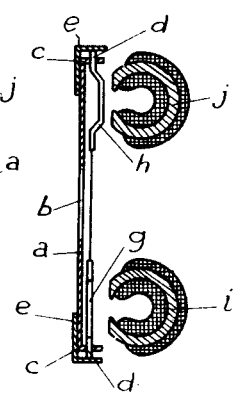
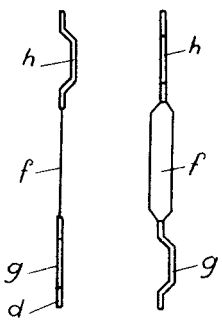
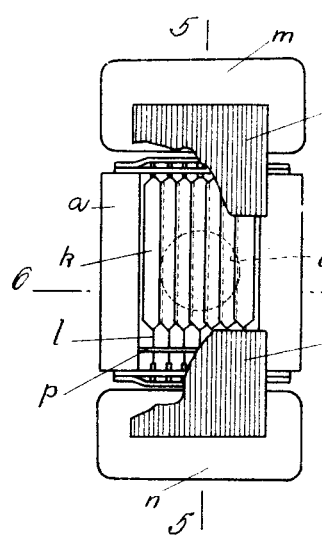
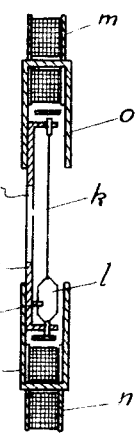
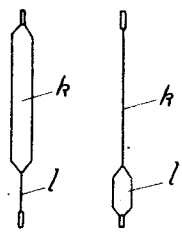
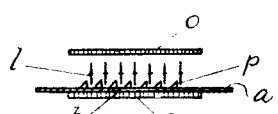
INVENTORS.
Charles Maury & Victor H. Houssin
By William C. Linton
Attorney

UNITED STATES PATENT OFFICE

CHARLES MAURY AND VICTOR ADRIEN HOUSSIN, OF BORDEAUX, FRANCE

DEVICE FOR GIVING MOVING PICTURES THE APPEARANCE OF RELIEF

Application filed June 30, 1931, Serial No. 547,995, and in France July 21, 1930.

It is an obvious fact that if it were possible to give moving pictures the appearance of relief as has already been provided for photographs made with a stereoscopic apparatus, the interest and beauty of the films would be considerably enhanced. But the problem is difficult to solve by reason of the fact that the performance is intended for an audience seated in a large hall.

The attempts made with a view to providing the appearance of relief on the screen have not yielded satisfactory results. Attempts have also been made with a view to provide a device with which each spectator is to be supplied.

The difficulties which are met in the provision of such devices have been found as important and as numerous as in the first case. However, practical embodiments have been made, but although they have yielded very interesting results, they have not proved commercially valuable by reason of their complicated constructions.

The object of our invention, the principle of which rests on well known optic phenomena, is chiefly concerned with the provision of a silent, cheap, compact and reliably working device.

We have described hereinafter two possible embodiments of our invention, which have been illustrated in accompanying drawing.

Fig. 1 is a front view of the arrangement used for shutting off the projection.

Fig. 2 is a longitudinal cross-section thereof taken on line 2—2 of Figure 1.

Fig. 3 is a view of a shutter blade shown alone in front and side views.

Fig. 4 is a front view of a modification of the arrangement.

Fig. 5 is a longitudinal cross-section thereof taken on line 5—5 of Figure 4.

Fig. 6 is a transversal cross-section thereof taken on line 6—6 of Figure 4 with certain parts removed.

Fig. 7 is a view of a shutter blade corresponding to this modification shown alone in front and side views.

According to our invention, two films are taken simultaneously by means of an apparatus provided with two object glasses, in the manner of stereoscopic view-taking apparatus. The views thus taken two by two form real stereoscopic views.

The simultaneous projection of two series of pictures taken in this manner would only produce a confused picture. But if the corresponding pictures are projected in alternation and if each spectator is provided with a device covering in alternation each of his eyes so that he may see with each eye only one set of pictures, the image perceived will become clear and the appearance of relief will be produced.

This result may be achieved by means of an arrangement shutting off in perfect synchronism the projection and the eyesight.

The difficulty of the problem lies in the necessity of having a small, light, speedy, silent and reliable shutter mechanism.

The arrangement described hereinbelow solves this difficulty.

The shutters comprise chiefly a system of very small-sized blades disposed next to one another and pivotally secured to a shaft whereby they are adapted to enter two different angular end positions. In one of these positions, the blades are parallel to the beam of light and allow the latter to pass unrestrictedly. In the second angular position, they are perpendicular to the beam of light and shut it off completely.

As concerns the observing apparatus, the blades being disposed very near the eye cause no disturbance to the sight, their position being such that their image is formed considerably to the rear of the retina.

The same arrangement when cooperating with the projection apparatus does not cause either any confusion in the clearness of the images.

The synchronized working of the two shutters may be obtained in several manners: through the use of rectified alternating current or of a succession of impulses of direct current or again by means of magnetic fields or of periodic suitably directed forces.

We have described hereinbelow by way of example an apparatus adapted to shut off the projection (Figs. 1, 2 and 3).

A plate *a* provided with an aperture *b* is folded at right angles at its two ends *c*. The folded parts of the plate are provided with an equal number of symmetrically disposed holes. These holes receive the pivots *d* of the shutter blades *f* disposed as shown in Figs. 1, 2 and 3.

Two small plates *e* of metal or any other suitable hard material secured to the plate *a* act as counter pivots and determine the position of the blades *f* while allowing them a great mobility. These blades preferably made of soft iron are provided between each end of their central flat part and the corresponding pivot *d* with crank-shaped parts *g* and *h*, of which one *g* is in the plane of the body of the blades *f* and the other is in a plane perpendicular thereto.

In front of these cranks are disposed two electromagnets *i* and *j*.

When the electromagnet *i* is excited, it attracts the crank-shaped parts *g* whereby the blades *f* are set perpendicularly to the plate *a* and uncover the aperture *b*. When the electromagnet *i* is no longer excited, current flows through the electromagnet *j* which acts in its turn on the crank-shaped parts *h* and returns the blades into a position parallel to the plate *a* thus shutting off the light to the opening *b*.

This device may be constructed sufficiently small to be conveniently placed in front of the eyes of the spectators. However, it is preferable to construct the device in the manner shown in Figures 4 to 7 which permits to reduce the weight thereof.

The blades are given in this case the shape illustrated in Fig. 7. The cranks are omitted and each movable part comprises merely two integral blades disposed at right angles with respect to each other. The electromagnets *m* and *n* arranged as shown in Fig. 6 act directly on the blades. When either of said electro-magnets is excited, the blades are set in the direction of the lines of force produced.

In order to prevent the devices carried near the eye from becoming hot, the cores of these electromagnets are constituted by bundles of iron wires *o*.

In order to prevent the blades from rotating throughout one revolution and becoming entangled, the part *l* abuts against the teeth of a rack *p*, the pitch of which is equal to the distance between two successive blades (Fig. 6).

This apparatus may also be executed in many other manners and the above descriptions have obviously been given only by way of example and the different types used are adapted to serve indifferently for shutting off the projection or the sight.

What we claim is:—

1. A light obstructing device for giving motion pictures the appearance of relief, comprising a series of relatively thin metallic blades arranged in parallel relation and adapted to pivot about their longitudinal axes for positioning in two different positions one substantially perpendicular to the other, each of said blades terminating with a part disposed at an angle with respect to the body of the blade, a support carrying the blades and having an opening therein to be covered by said blades, and electro-magnetic means arranged adjacent the angularly disposed parts terminating the blade and acting thereon to successively displace the blades in parallel relation to the opening in the support or in perpendicular relation to said opening.

2. A light obstructing device for giving motion pictures the appearance of relief, comprising a series of relatively thin metallic blades arranged in parallel relation and adapted to pivot about their longitudinal axes for positioning in two different positions one substantially perpendicular to the other, a crank-shaped part extending longitudinally from one end of each of said blades and disposed in the plane thereof, another crank-shaped part extending from the remaining extremity of each of said blades and disposed perpendicularly to the plane of the latter, a support carrying said blades and having an opening therein covered by said blades, and a pair of electro-magnets each arranged adjacent the opposed crank-shaped parts and acting thereon to displace the blades successively in parallel relation to the opening in the support or in perpendicular relation to said opening.

3. A light obstructing device for giving motion pictures the appearance of relief, comprising a series of relatively thin metallic blades arranged in parallel relation and adapted to pivot about their longitudinal axes for positioning in two different positions one substantially perpendicular to the other, a secondary blade extending from each of the first mentioned blades and arranged perpendicularly thereto, a rack having its teeth projecting in the intervals between the blades to limit the movement thereof, a support carrying said blades and having an opening therein covered by the first mentioned blades, and a pair of electro-magnets acting successively on the first mentioned blades and on the secondary blades to successively displace said first mentioned blades in parallel relation to the opening in the support or in perpendicular relation to said opening.

CHARLES MAURY.
VICTOR ADRIEN HOUSSIN.